United States Patent
Duschesne et al.

(10) Patent No.: US 8,444,774 B2
(45) Date of Patent: May 21, 2013

(54) FLUX COMPOSITION AND PROCESS FOR USE THEREOF

(75) Inventors: Eric Duschesne, Armonk, NY (US); Kang-Wook Lee, Armonk, NY (US); Valerie Oberson, Armonk, NY (US)

(73) Assignee: International Business Machines Corporation, Armonk, NY (US)

(*) Notice: Subject to any disclaimer, the term of this patent is extended or adjusted under 35 U.S.C. 154(b) by 525 days.

(21) Appl. No.: 12/731,369

(22) Filed: Mar. 25, 2010

(65) Prior Publication Data

US 2010/0175790 A1   Jul. 15, 2010

Related U.S. Application Data

(62) Division of application No. 11/493,724, filed on Jul. 26, 2006, now Pat. No. 7,780,801.

(51) Int. Cl.
 *B23K 35/34* (2006.01)
(52) U.S. Cl.
 USPC ............................................. 148/23; 148/528
(58) Field of Classification Search
 USPC ................... 228/207; 528/272; 148/23, 528
 See application file for complete search history.

(56) References Cited

U.S. PATENT DOCUMENTS

| | | | |
|---|---|---|---|
| 4,340,167 A | 7/1982 | Packer et al. | 228/180.1 |
| 4,438,189 A | 3/1984 | Geissler et al. | |
| 4,561,913 A | 12/1985 | Zado | 148/23 |
| 4,568,395 A | 2/1986 | Nabhani | 148/23 |
| RE32,309 E | 12/1986 | Hwang | 148/23 |
| 4,995,921 A | 2/1991 | Davis et al. | 148/22 |
| 5,004,509 A | 4/1991 | Bristol | 148/23 |
| 5,009,724 A | 4/1991 | Dodd et al. | 148/23 |
| 5,089,376 A | 2/1992 | Setthachayanon | |
| 5,091,242 A | 2/1992 | Chung | 428/301.1 |
| 5,122,201 A | 6/1992 | Frazier et al. | 148/23 |
| 5,131,962 A | 7/1992 | Minahara et al. | 148/23 |
| 5,176,759 A | 1/1993 | Taguchi | 148/24 |
| 5,376,403 A | 12/1994 | Capote et al. | 252/512 |
| 5,411,602 A | 5/1995 | Hayes | 148/23 |
| 5,615,827 A | 4/1997 | Arldt et al. | 228/223 |
| 5,830,389 A | 11/1998 | Capote et al. | 252/512 |
| 6,050,480 A | 4/2000 | Taguchi et al. | 228/248.1 |
| 6,476,487 B2 | 11/2002 | Kuramoto | 257/738 |
| 6,599,372 B2 | 7/2003 | Arora et al. | 148/23 |
| 6,796,482 B2 | 9/2004 | Wetz et al. | 228/207 |
| 7,022,266 B1 | 4/2006 | Craig | 252/512 |
| 7,059,512 B2 | 6/2006 | Arita et al. | 228/254 |
| 2001/0042775 A1 | 11/2001 | Arora et al. | 228/180.1 |
| 2003/0125505 A1* | 7/2003 | Weaver et al. | 528/272 |
| 2004/0020562 A1 | 2/2004 | Wetz et al. | 228/207 |
| 2004/0084510 A1* | 5/2004 | Wetz et al. | 228/207 |
| 2004/0129344 A1 | 7/2004 | Arita et al. | 148/23 |
| 2005/0241731 A1 | 11/2005 | Duchesne et al. | 148/25 |

\* cited by examiner

*Primary Examiner* — Weiping Zhu
(74) *Attorney, Agent, or Firm* — Robert J. Eichelburg; The Law Offices of Robert J. Eichelburg

(57) ABSTRACT

The invention relates to a composition of matter comprising a soldering flux, wherein the flux consists essentially of a combination of a fluxing agent and a solvent, and wherein the fluxing agent comprises a keto acid such as levulinic acid or acetylbutyric acid. The flux may also comprises an ester acid, or comprises a mixture of the keto acid with the ester acid. The solvent comprises a mixture of a tacky solvent with a non-tacky solvent. The invention also relates to a process comprising soldering at least two surfaces together, each of which comprises a metal area to which solder can adhere by employing the following steps in any order: applying solder to at least one of the metal areas, aligning the metal areas so that they are superimposed over one another, heating at least one of the areas to a temperature that comprises at least the melting temperature of the solder. The last step comprises joining the superimposed areas to one another. The process employs the flux composition operatively associated with the solder, and in one embodiment the invention comprises a mixture of the flux composition with powdered solder. In another embodiment, the process comprises IMS, C4 and C4NP processes and the solder comprises a lead free solder. The invention also comprises a product produced by the foregoing process or processes.

8 Claims, No Drawings

FLUX COMPOSITION AND PROCESS FOR USE THEREOF

This application is a Divisional Application of U.S. patent application Ser. No. 11/493,724, filed on Jul. 26, 2006, now U.S. Pat. No. 7,780,801, incorporated herein by reference in its entirety.

FIELD OF THE INVENTION

The field of the invention comprises a new flux composition of matter and processes for using the composition for soldering at least two surfaces, each of which comprises a metal area that can adhere to solder.

RELATED ART

Flip-Chip Solder-Bump Interconnections

Gruber et al. in their paper "Low-cost wafer bumping," *IBM Journal of Research and Development*, IBM JRD 49-4/5 (http://www.research.ibm.com/jpournal/rd/494/gruber.html) (Aug. 16, 2005) describe flip-chip solder-bump interconnections as the face-down soldering of integrated circuit (IC) devices to chip carriers by means of conductive bumps on the chip bond pad. The use of this bump technology also extends to passive filters, detector arrays and MEMs devices. IBM introduced this technology in the early 1960's with the solid logic technology in the IBM System/360™. It extended interconnection capabilities beyond existing wire-bonding techniques, allowing the area array solder-bump configuration to extend over the entire surface of the chip (die) providing solder bumps for interconnection to a substrate by the C4 (controlled collapse chip connection) solder reflow process. This allowed for the highest possible I/O (input/output) counts to meet the increasing demand for electrical functionality and reliability in IC technology.

The original wafer-bumping process of metal mask evaporation in which ball-limiting metallurgy (BLM) also known as under board metallization, or under mask metallization, or under mask-bump metallurgy (UBM) involve the evaporation onto a wafer surface of solder through mask openings in an area array fashion. The need for increased I/O density and count, and pressures to lower the cost of flip-chip interconnections have spurred the development of other wafer bumping techniques such as electroplating or stencil-printing/paste-screening (solder paste) bump processes. Solder pastes consist of a mixture of solder metal and flux utilized in a reflow process that results in the formation of voids in the solder joint that in some applications can affect reliability. The end use dictates the selection of the solder paste process since some low-cost applications can tolerate voids. Some of the more newly developed bumping processes include transfer, printing, solder jetting, and bumpless and conductive particle applications.

In its broader aspect, BLM, or UBM comprises the application of a metal coating to the die contact pads such as aluminum or copper contact pads, where the metal coating provides a surface that can adhere to solder. One process involves cleaning an aluminum terminal pad followed by activation to remove any aluminum oxide layer on the pad and applying a thin layer of zinc by means of a single or double zincate coating. By following this coating with an electroless Ni(P) plating process the zinc is replaced with nickel which forms a strong bond between the nickel and aluminum. Manufacturers use a similar process for a copper terminal pad with the exception that they clean the pad first with a dilute etchant, followed by activation with a palladium dispersion or solution and then apply the electroless Ni (P) film, or alternatively an electrolytic or sputtered Ni (V) film. Subsequent steps involve application of solder, e.g., solder "bumps" to the metal coating. Gruber et al. (supra) give a detailed explanation of all of the foregoing processes.

The so-called "solder bumps" provide a space between the chip and the board, usually filled in the last steps of the manufacturing process with a nonconductive "underfill" material that adhesively joins the entire surface of the chip or die to the substrate. The underfill not only blocks water or other contaminants from entering into the structure but also locks the chip or die to the substrate so that differences in thermal expansion do not break or damage the electrical connections of the bumps. A flux compatible with underfill avoids many adhesion and failure problems in the device, but manufacturers preferably remove the flux before placing the underfill in the device. This presents difficulties since the space between the two surfaces doesn't allow for readily flushing out flux residues which has given rise to a need to develop fluxes that volatilize at elevated temperatures to facilitate their removal.

Government regulations and customer needs have also impacted flip-chip interconnection technology requiring manufacturers to make a major transition from Pb/Sn to Pb-free solders and to produce larger wafers. Pb-free solder introduced new challenges such as the compatibility of the bumping process with a wide variety of these solders, each of which may require different processing conditions. Additionally, the transition from 200-mm to 300-mm wafers requires a bumping process that can readily accommodate this nearly 125% area increase with no negative effect on bumping yields and/or overall bump quality.

As a result, new solder-bumping technologies have developed that include some of the attributes of plating (extendibility to larger wafers and smaller bump size/pitch) and solder paste screening (flexibility of Pb-free alloy selection and low cost). One process comprises injection-molded solder (IMS) technology developed at IBM Research as an outgrowth of earlier work using solder for high performance thermal joints.

The first step in the IMS process involves coating the mold and/or wafer with a thin layer of flux to reduce solder oxide formation and to enable solder wetting of the BLM during the subsequent reflow temperature step. Flux selection, viscosity, distribution, and thickness become increasingly important when increasing the size of the wafer from 200 mm to 300 mm. The main challenge in manufacturing the larger wafer involved striking a balance between ensuring flux presence on all bump sites across this large span without creating or at least minimizing regions of excess flux that might otherwise prevent contact between bump and BLM. Excess flux also creates problems of flux removal.

Researchers recognized that voids in the solder interface in the IMS process created "hot spots" in silicon devices at elevated power densities during testing. Vacuum reflow techniques reduced or eliminated these voids but added undesirable steps that increased cost. This led to the development of a process that employed injection molding to form solder into biconvex shaped performs for placement at the thermal interface and reflowed in air. The crowned shape of these performs guaranteed that wetting would start at the center and expand outwardly to eliminate voids at the interface. With this innovation, researchers also realized they could control the flow of molten solder for a variety of interconnect applications, such as solder ball and solder column arrays as well as ceramic and organic chip carriers with 200 µm diameter bumps. The system also readily accommodated changes in solder compositions as demonstrated by its ability to process 19 different Pb-free solder alloys with equal ease. In time, manufacturers applied these basic process steps to many other substrates, including ball grid arrays, interposers containing smaller (8 mil diameter) balls, ceramic column grid arrays (CCGAs), and individual silicon chips.

Industry nonetheless pressed for lower cost, higher quality bumping processes, and to this end IBM developed the C4NP (C4 new process, announced on Sep. 13, 2004) for IMS wafer bumping processes. Gruber et al. (supra) describe this process which basically involves processing a wafer and a solder mold simultaneously, but in separate processes that subsequently merge. Solder fills the mold in a prearranged pattern, after which the filled mold goes through an inspection step and alignment step with a wafer. Prior to alignment the wafer undergoes BLM deposition and patterning followed by inspection. After aligning mold and wafer the assembled components go through a reflow process to transfer solder to the wafer. Again, wafer and/or mold preparation involve application of a solder flux in a way to avoid or minimize excess flux on either surface.

Manufacturers apply the flux to substrates in a variety of ways including inter alia methods comprising dip application, spray application, brush application, dispense application and stamp application. Ning-Cheng Lee summarizes these methods in "Fluxing for Flip Chip," Flipchips.com, http//www.flipchips.com/tutorial18html.

Other publications also describes flip chip manufacturing methods including inter alia "Injection Molded Soldering," http//www.research.ibm.com/ims/; and "Flipchips.com Tutorials," http//www.flipchips.com/tutorial01html; http//www.flipchips.com/tutorial02ahtml; http//www.flipchips.com/tutorial06html; http//www.flipchips.com/tutorial12html; http//www.flipchips.com/tutorial16html; http//www-.flipchips.com/tutorial18html; http//www.flipchips.com/tutorial48html; and http//www.flipchips.com/tutorial55html.

As pointed out above, a great number of processes that involve attaching a flip chip to a substrate through ball grid array (BGA) soldering require a flux to reduce oxidation not only of the solder, but also BLM or UBM. Thus the flux helps the solders to melt and join. As the material of BGA or solder in general changes from Pb/Sn to Pb-free metals the joining processes and the reliability requirements become more difficult. The reflow temperature for melting the solder employed in flip chip joining increases from about 220° C. for Pb/Sn solders to about 255° C. for Pb-free solders. These higher temperatures increases the rate of oxidation of the solder and the metal surfaces of the solder joint requiring very efficient fluxes or fluxing processes to reduce and thereby minimize or eliminate the oxidation since oxides in the solder joint weaken the bond between soldered surfaces. Also, as the density of C4 arrays and the chip size increase, it becomes harder to clean flux residues formed during chip joining.

Using larger quantities of flux materials doesn't always address this problem since this invariably results in creating large flux residues on the device which can cause failures in microelectronic packages, typically by interfering with the adhesion of the underfill material to both the electronic device and the substrate connected to it which have, for the most part, different coefficients of thermal expansion which the underfill material addresses by strongly adhering one to the other.

Commercially available fluxes either leave large quantities of flux residue on the chip or device surface or contain chloride ions which can cause problems in controlling manufacturing processes due to the corrosive nature of chloride ions. On the other hand a tacky version of a diacid based flux (e.g. pimelic acid and glutaric acid) can leave a polyester residue that in some instances cannot be readily removed. Cf. United States Published Patent Application 20050241731. Flux residues such as these can cause problems, e.g., interference with the adhesion of underfill materials to the device and substrate, which in turn could cause failure of the microelectronic package. All of the foregoing illustrates a need for a new type of flux to achieve reliability and process control for modern electronic packaging.

SUMMARY OF THE INVENTION

The foregoing indicates a need for a removable or a substantially removable flux composition of matter to substantially minimize or substantially eliminate flux residues when soldering electronic components, especially in soldering IC devices to electrically conductive substrates, as for example, in IMS, or C4, or C4NP processes. The foregoing also indicates a need for a process to obtain a device comprising soldered electronic components, especially IC devices soldered to electrically conductive substrates, such as for example by using IMS or C4 or C4NP processes and at the end of the process, substantially minimizing or substantially eliminating any flux used in the soldering process.

Accordingly, the present invention provides such a composition or compositions and a process or processes that address these needs to not only provide advantages over the related art, but also to substantially obviate one or more of the foregoing and other limitations and disadvantages of flux compositions and processes for using them. The invention also comprises a product produced by the foregoing process or processes.

The description that follows sets forth features and advantages of the invention apparent not only from the description but also by practicing the invention. The written description, abstract of the disclosure, and the claims, or as any of the foregoing may be subsequently amended will set forth additional features and advantages of the invention and particularly point out the objectives and other advantages of the invention showing how they may be realized and obtained.

To achieve these and other advantages, and in accordance with the purpose of the invention as embodied and broadly described herein, the invention comprises a flux composition, wherein the flux consists essentially of a combination of a fluxing agent and a solvent, wherein the fluxing agent: comprises a keto acid, or comprises an ester acid, or comprises a mixture of the keto acid with the ester acid, and wherein the solvent comprises a mixture of a tacky solvent with a non-tacky solvent.

The invention also comprises a process of soldering together at least two surfaces, each of which comprises a metal area to which solder can adhere. The process comprises the following steps in any order: applying solder to at least one of the metal areas, aligning the metal areas so that they are superimposed over one another, and heating at least one of the areas to a temperature that comprises at least the melting temperature of the solder. The last step comprises joining the superimposed areas to one another after subjecting them to these process steps. The soldering is conducted with the flux composition operatively associated with the solder, e.g., the process includes applying the flux composition to either one or both surfaces, or in combination with the solder. The invention also comprises a product produced by the foregoing process or processes.

DETAILED DESCRIPTION OF THE INVENTION

The inventors have discovered a composition of matter comprising a soldering composition which comprises a flux, wherein the flux consists essentially of a combination of a fluxing agent and a solvent; wherein the fluxing agent comprises a keto acid, or comprises an ester acid, or comprises a mixture of the keto acid with the ester acid, and wherein the solvent comprises a mixture of a tacky solvent with a non-tacky solvent.

The keto acids and ester acids used in the invention comprise compounds having from about 3 to about 22 carbon atoms. Examples of keto acids used in the invention comprise acids such as levulinic acid, acetylbutyric acid, dimethylevulinic acid (mesitonic acid), methyllevulinic acid (homo levulinic acid, or phi-keto-caproic acid), 2-amino-4-oxo-5-phosphonopentanoic acid, 2-benzyl-5-cyano-oxopentanoic acid, 2-hydroxy2-methyllevulinic acid, 5-hydroxy-5-phenyllevulinic acid, aminolevulinic acid, acetyl butyric acid, pyruvic acid, (hydroxyphosphinyl)pyruvic acid, 3-(pentylthio)pyruvic acid, 3-aminoenolpyruvate-2-phosphate, 3-formylpyruvic acid, 3-phosphonopyruvate, 4-nitrophenyl-3-diazopyruvate, acetylpyruvic acid, β-sulfopyruvic acid, carboxymethylselenopyruvic acid, carboxyphosphino pyruvic acid, hydroxypyruvic acid, phenyl pyruvic acids, phosphohydroxypyruvic acid, pyruvamide, pyruvate hydrozone, pyruvate phenylhydrozone, pyruvic acid semicarbazone, pyruvic acid thiosemicarbazone, pyruvylglycine, sulfoenolpyruvate, acetoacetic acid, propyonyl-carboxylic acid, phthalonic acid, 2-ketopentanoic acid, 2-ketosuberic acid (2-ketosuberate), 27-oxooctacosanoic acid, 9-oxononaoic acid, α-keto-β-methylvaleric acid, α-ketoisocaproic acid, α-ketoisovaleric acid (α-ketoisovalerate), α-ketoglutaric acid, β-ketoglutaric, 2-keto-4-hydroxyglutarate, 3,4-didehydro-2-ketoglutaric acid, α-ketoglutaramate, (−)2,3:4,6-di-O-isopropylidene-2-keto-L-gluconic acid, 2-keto-3-methylbutyric acid, 2-keto-4-methylpentanoic acid, 2-keto-D-gluconic acid, 3-methyl-2-oxovaleric acid, 5-keto-D-gluconic acid, 5β-cholanic acid-3-one, α-keto-γ-(methylthio) butyric acid, 3-α-hydroxy-12-keto-Δ9(11)-cholenic acid, 2-keto-3-deoxyoctanoic acid, cis-3-benzoylcyclopentane-1-carboxylic acid, cis-3(2-methylbenzoyl)cyclopentane-1-carboxylic acid, cis-3(3-methylbenzoyl)cyclopentane-1-carboxylic acid, cis-3(3-methoxybenzoyl)cyclopentane-1-carboxylic acid, cis-3(4-methoxybenzoyl)cyclopentane-1-carboxylic acid, cis-3(2-thiomethylbenzoyl)cyclopentane-1-carboxylic acid, cis-3(2-ethylbenzoyl)cyclopentane-1-carboxylic acid, cis-3(4-ethylbenzoyl)cyclopentane-1-carboxylic acid, cis-3(2,3-dimethylbenzoyl)cyclopentane-1-carboxylic acid, and the lower alkyl esters thereof, where lower alkyl comprises either straight chain or branched chain alkyl groups having from 1 to about 5 carbon atoms and may be unsubstitued or substituted with hydroxyl, amino, phosphorous or carboxyl groups.

The foregoing keto acids may also comprise the salts of these keto acids which may comprise the alkali metal salts, alkaline earth salts, ammonium salts, ammonia salts or amine salts where the amines may comprise lower alkyl monoamines or diamines, lower alkyl having been defined previously herein. In one embodiment of the invention the keto acids and/or their esters, and/or their salts, all as described herein, are selected to substantially avoid or substantially minimize the formation of residues that have a corrosive action on the substrate, or the metal area on the substrate, or the solder applied to such metal areas. The invention also includes mixtures of any of the foregoing keto acids, esters of keto acids or salts of keto acids, including composition comprising eutectic or azeotropic mixtures.

The ester acids used in the invention comprise the lower alkyl mono esters of oxalic acid, malonic acid, maleic acid, succinic acid, glutaric acid adipic acid, pimelic acid, suberic acid, azelaic acid, sebacic acid, brassic acid, brassylic acid, or roccellic acid where lower alkyl has been defined above. The ester acids used in the invention also comprise 1,2-cyclohexanedicarboxylic acid mono-methyl ester, phthalic acid mono-(1-ethyl-2-phenyl-butyl)ester, phthalic acid mono-(1-ethyl-2-phenyl-propyl)ester, phthalic acid mono-(1-isopropyl-3-methyl-2-phenyl-butyl)ester, phthalic acid mono-(1-methyl-2-phenyl-butyl)ester, phthalic acid mono-(1-phenyl-ethyl) ester, phthalic acid mono-(2-methyl-1,2-diphenyl-butyl) ester, phthalic acid mono-(2-methyl-1-phenyl-propyl)ester, phthalic acid mono-(3,3-dimethyl-cyclohexyl)ester, phthalic acid mono-bicyclo(10.2.2)hexadecα-1(15), 12(16),13-trien-6-yl ester, phthalic acid mono-bicyclo(9.2.2)hexadecα-1(14), 11(15),12-trien-6-yl ester, phthalic acid mono-sec.butyl ester, phthalic acid mono-tricyclo(8,2.2.2(4,7))hexaen-2-yl ester, succinic acid mono-O-tolyl ester cis-2-carbomethoxy-cyclopentane-1-carboxylic acid, and trans-2-carbomethoxy-cyclopentane-1-carboxylic acid.

The foregoing ester acids may also comprise the salts of these ester acids which may comprise either the alkali metal salts, alkaline earth salts, ammonium salts, ammonia salts or amine salts where the amines may comprise lower alkyl monoamines or diamines, lower alkyl having been defined previously herein. In one embodiment of the invention the ester acids and/or their salts, all as described herein, are selected to substantially avoid or substantially minimize the formation of residues that have a corrosive action on the substrate, or the metal area on the substrate, or the solder applied to such metal areas. The invention also includes mixtures of any of the foregoing ester acids, or salts of ester acids, or any of these compounds, including compositions comprising eutectic or azeotropic mixtures.

The ester acids and/or their salts, or mixtures thereof, all as described herein, are combined with the foregoing keto acids or salts of keto acids or esters of keto acids or mixtures thereof to form the flux material of the invention, and when combined also comprise any eutectic or azeotropic mixture.

In another aspect, the invention also comprises selecting the foregoing keto acids and ester acids or mixtures, all as described herein, that have boiling points from about 100° C. to about 350° C. or from about 150° C. to about 325° C., or from about 200° C. to about 300° C. so that there is substantially no keto acid or ester acid left on the surfaces after chip joining or a substantially negligible amount of keto acid or ester acid left on the surfaces after chip joining, e.g., keto acid or ester acid in amounts small enough so as not to substantially interfere with chip integrity, chip function or chip life.

In one embodiment of the invention, the flux comprises levulinic acid or acetyl butyric acid or mixtures thereof.

The other aspect of the invention comprises the use inter alia of a tacky solvent with the flux. Tacky solvents comprise those solvents inherently having a tensile stress greater than the tensile stress of petrolatum. Zeidler, *Journal Seifen. Ole, Fette Wache,* 118 (1992) 1001 describes the method for measuring the tensile stress of solvents for the purpose of the present invention. Some of these tacky solvents comprise polyhydric alcohols such as glycerol, glycerol ethoxylates such as glycerol monoethoxylate, glycerol diethoxylate, glycerol triethoxylate, glycerol propoxylates such as glycerol monopropoxylate, glycerol dipropoxylate, glycerol tripropoxylate, polyalkylene glycols, or alkylene polyols, as well as propylene glycol, dipropylene glycol, polypropylene glycol, polyethylene glycol, sorbitol, hydroxypropyl sorbitol, hexylene glycol, 1-3butylene glycol, 1,2,6 hexane triol, butane triol, ethoxylated glycerin, propoxylated glycerin, or mixtures thereof of any of the foregoing solvents, where the mixtures can comprise azeotropic mixtures.

The tacky solvent is used in combination with a non-tacky solvent, the latter comprising those solvents inherently having a tensile stress less than the tensile stress of petrolatum using the method of Zeidler (supra), and include alcohols, having from about 1 to about 10 carbon atoms, such as methanol, ethanol, 2-propanol, 1-methoxy-2-propanol, 2-methoxyethanol, 2-ethoxyethanol, 3-ethoxy 1-propanol, 2-butoxyethanol, ethylene glycol butyl ether, propylene glycol propyl ether, di(propylene glycol) propyl ether, and di(propylene glycol) methyl ether or mixtures of any of the foregoing solvents, where the mixtures can comprise azeotropic mixtures; esters, having from 2 to about 5 carbon atoms, such as ethyl acetate, ketones, having from 2 to about 5 carbon atoms, such as acetone and methyl ethyl ketone.

The ratio of tacky solvent to non-tacky solvent varies from about 1 to about 100 on a weight basis. Also, the ratio of non-tacky solvent to tacky solvent varies from about 1 to about 100 on a weight basis. In one embodiment, the keto acid or ester acid or the mixtures thereof are present in an amount from about 6 weight % to about 15 weight %, the tacky solvent comprises an amount from about 50 weight % to about 80 weight %, and the non-tacky solvent comprises an amount from about 10 weight % to about 30 weight %, all based on the weight of the flux composition. Mixtures of the keto acids and keto esters include azeotropic mixtures.

Another aspect of the invention comprises selecting components of the flux for use with Pb-free solders having melting temperatures higher than solders containing lead (e.g. compositions with melting temperatures of about 300° C. or higher), otherwise the solder is based on a metal comprising a Group VA metal, A Group IVA metal, a Group IIIA metal, a Group IIB metal or a Group IB metal and includes single metals or more than one metal, e.g., the solder comprises at least a two component mixture or at least a two component alloy of a Group VA metal, A Group IVA metal, a Group IIIA metal, a Group IIB metal or a Group IB metal or mixtures of the alloys with a Group VA metal, a Group IVA metal, a Group IIIA metal, a Group IIB metal or a Group IB metal. These Group numbers correspond to the "CAS version" of the Periodic Table of the Elements, not to be confused with the previous "IUPAC form," or the newer assignment of Group numbers to the elements in the Periodic Table. The invention also comprises eutectic combinations of these elements. Lead-free solders coming within the entire definition of solders given above comprise inter alia Sn/Cu, Sn/Ag, or Sn/Ag/Cu solders.

The composition and process of the invention also comprise using the flux described herein with powdered solder materials for those applications calling for solder/flux mixtures for joining metal surfaces together. Liu et al. U.S. Pat. No. 7,017,795; Arita et al. United States Patent Application No. 20040129344, Craig et al. U.S. Pat. No. 7,022,266, and Craig et al. U.S. Pat. No. 5,830,389 describe methods of using combinations of solder powder and a flux material for soldering metal surfaces. Hwang RE32,309 similarly describes powder solder/flux combinations with solder powders ranging from about −200 to about +400 mesh (U.S. Standard Sieve Size) as does Chung, U.S. Pat. No. 5,091,242 who uses a 325 Mesh (U.S. Standard Sieve Size) or about 21 µm to about 25 µm powdered solder in combination with a flux, whereas Hayes U.S. Pat. No. 5,411,602 describes methods for manufacturing solder powders and other metal powders.

Adjustment of the ratios of flux to solder to solvent provide the right consistency of the resultant composition to enable application by ink-jet spraying, printing, screening, brushing or any other method commonly used in the art.

One aspect of the composition in this regard comprises a lux, wherein said flux consists essentially of a combination of:
(a) a fluxing agent; and
(b) a solvent;
(c) wherein said fluxing agent:
 (1) comprises a keto acid; or
 (2) comprises an ester acid; or
 (3) comprises a mixture of said keto acid with said ester acid; and wherein said solvent consists essentially of a tacky solvent and a non-tacky solvent
 (1) wherein said tacky solvent is selected from ethoxylated glycerol, propoxylated glycerol, or mixtures thereof;
 (2) said non-tacky solvent is selected from methanol, ethanol, 2-propanol, 1-methoxy-2-propanol, 2-methoxyethanol, 2-ethoxyethanol, 3-ethoxy 1-propanol, 2-butoxyethanol, ethylene glycol butyl ether, propylene glycol propyl ether, di (propylene glycol) propyl ether, di (propylene glycol) methyl ether, ethyl acetate, acetone, methyl ethyl ketone or mixtures thereof.

and wherein said keto acid or ester acid or the mixtures thereof are present in an amount comprising from about 6 weight % to about 15 weight %, said tacky solvent in an amount comprising from about 50 weight % to about 80 weight %, and said non-tacky solvent in an amount comprising from about 10 weight % to about 30 weight %, all based on the weight of said flux composition.

Other aspects of the composition of the invention include materials wherein said keto acid and said ester add have from about 3 to about 22 carbon atoms; said keto add and said ester add mixture have a boiling point from about 200° C. to about 300° C.; said keto acid is selected from levulinic acid, acetyl butyric acid, 2-acetylbenzoic acid, 2-ketobutyric acid, acetoxyacetic acid, and pyruvic acid or mixtures thereof; said composition comprises powdered solder in addition to said flux; said solder comprises a Group VA metal, A Group IVA metal, a Group IIIA metal, a Group IIB metal or a Group IB metal; or said solder comprises a lead free solder.

The invention also comprises a process for soldering together at least two surfaces each of which comprises a metal area to which solder can adhere. The process comprises performing the following steps in any order: applying solder to at least one of the metal areas, aligning the metal areas so that they are superimposed over one another, heating at least one of the areas to a temperature that comprises at least the melting temperature of the solder. The last step comprises joining the superimposed areas to one another after subjecting them to these process steps. The soldering is conducted with the flux composition operatively associated with the solder, e.g., the process comprises applying the solder in combination with the flux composition as defined herein, such as applying the flux separately from the solder to one or both of the two surfaces, or applying a mixture of flux and solder such as powdered solder. The process enables the joining of at least two metal surfaces to which solder will adhere, but especially soldering operations involving IMS, such as C4 and C4NP processes. The invention also comprises a product produced by any of the foregoing process.

EXAMPLES

Flux A is prepared with 10 wt. % levulinic acid, 20 wt. % 2-propanol, and 70 wt. % glycerol, and Flux B with 10 wt. % acetylbutyric acid, 20 wt. % 2-propanol, and 70 wt. % glycerol. The metal contact capture pads of a laminate are coated with Flux A in one experiment and Flux B in another. The coated metal contact capture pads of each laminate are then aligned with lead free Sn/Cu, or Sn/Ag, or Sn/Ag/Cu solder bumps on a chip. Examples of these solders comprise Sn-3.5 wt. % Ag; Sn-0.7 wt. % Cu; and Sn-3.8 wt. % Ag-0.7 wt. % Cu. A chip-laminate module is formed by abutting the coated capture pads against the solder bumps and subjecting the module to a solder reflow process at 255° C. to join the laminate to the chip. Flux residue at the chip-laminate gap is removed with 1M sulfuric acid followed by a DI (deionized water) rinse. No significant residue is left on the chip or the laminate. Other flux formulations with about 6% or about 15% keto acids also worked well.

When a non-volatile tacky agent such as glycerol ethoxylate was employed, the flux residue could be cleaned with DI water. The temperature of the DI water was from about 50° to about 70° C.

Throughout this specification, the inventors have set out equivalents, such as, and without limitation, equivalent elements, materials, compounds, compositions, conditions, processes, structures and the like, and even though set out individually, also include combinations of these equivalents such as the two component, three component, or four component combinations, including such combinations of equivalent elements, materials, compounds, or compositions in any ratios.

Additionally, the various numerical ranges describing the invention as set forth throughout the specification also includes any combination of the lower ends of the ranges with the higher ends of the ranges, and any single numerical value, or any single numerical value that will reduce the scope of the lower limits of the range or the scope of the higher limits of the range, and ranges falling within any of these ranges.

The term "about" or "substantially" as applied to any parameters herein, such as a numerical value, including values used to describe numerical ranges, means slight variations in the parameter. In another embodiment, the terms "about," "substantial," or "substantially," when employed to define numerical parameter include, e.g., a variation up to five percent, ten percent, or 15 percent, or somewhat higher or lower than the upper limit of five percent, ten percent, or 15 percent. The term "up to" that defines numerical parameters means zero or a miniscule number, e.g., 0.001. The terms "about," "substantial" and "substantially" mean that which is largely or for the most part entirely specified. The inventors also employ the terms "substantial," "substantially," and "about" in the same way as a person with ordinary skill in the art would understand them or employ them.

All scientific journal articles and other articles as well as patents that this written description mentions including the references cited in such scientific journal articles and other articles, and such patents, are incorporated herein by reference in their entirety.

Although the inventors have described their invention by reference to some embodiments, they do not intend that such embodiments should limit their invention, but that other embodiments defined by the doctrine of equivalents are intended to be included as falling within the broad scope and spirit of the foregoing written description, as well as the Abstract of the Invention, and claims.

We claim as our invention:

1. A composition of matter comprising a flux, wherein said flux consists essentially of a combination of:
    (a) a fluxing agent; and
    (b) a solvent; wherein said fluxing agent:
        (1) comprises a keto acid; or
        (2) comprises an ester acid; or
        (3) comprises a mixture of said keto acid with said ester acid; and
wherein said solvent comprises a mixture of a tacky solvent selected from polyhydric alcohols or mixtures thereof, and a non-tacky solvent selected from monohydric alcohols or mixtures thereof;
where said flux composition consists essentially of a combination of:
    (a) a fluxing agent; and
    (b) a solvent;
wherein said fluxing agent:
    (1) comprises a keto acid; or
    (2) comprises an ester acid; or
    (3) comprises a mixture of said keto acid with said ester acid; and
wherein said solvent consists essentially of a tacky solvent and a non-tacky solvent
    (1) wherein said tacky solvent is selected from ethoxylated glycerol, propoxylated glycerol, or mixtures thereof;
    (2) said non-tacky solvent is selected from methanol, ethanol, 2-propanol, 1-methoxy-2-propanol, 2-methoxyethanol, 2-ethoxyethanol, 3-ethoxy 1 -propanol, 2-butoxyethanol, ethylene glycol butyl ether, propylene glycol propyl ether, di(propylene glycol) propyl ether, di(propylene glycol) methyl ether, ethyl acetate, acetone, methyl ethyl ketone or mixtures thereof;
and wherein said keto acid or ester acid or the mixtures thereof are present in an amount comprising from about 6 weight % to about 15 weight %, said tacky solvent in an amount comprising from about 50 weight % to about 80 weight %, and said non-tacky solvent in an amount comprising from about 10 weight % to about 30 weight %, all based on the weight of said flux composition.

2. The composition of claim 1 wherein said keto acid and said ester acid have from about 3 to about 22 carbon atoms.

3. The composition of claim 1 wherein said keto acid and said ester acid mixture have a boiling point from about 200° C. to about 300° C.

4. The composition of claim 1 wherein said keto acid is selected from levulinic acid, acetyl butyric acid, 2-acetylbenzoic acid, 2-ketobutyric acid, acetoxyacetic acid, and pyruvic acid or mixtures thereof.

5. The composition of claim 1 wherein said keto acid comprises levulinic add or acetyl butyric acid or mixtures thereof.

6. The composition of claim 1 wherein said composition comprises powdered solder in addition to said flux.

7. The composition of claim 1 wherein said solder comprises a Group VA metal, A Group IVA metal, a Group IIIA metal, a Group IIB metal or a Group IB metal.

8. The composition of claim 7 comprising a lead free solder.

* * * * *